(12) United States Patent
Burch et al.

(10) Patent No.: US 7,250,388 B2
(45) Date of Patent: Jul. 31, 2007

(54) MEDIUM FOR CHROMATOGRAPHIC SEPARATIONS

(75) Inventors: Eric L Burch, San Diego, CA (US); James O. Stoffer, Rolla, MO (US); Thomas Schuman, Rolla, MO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 10/703,650

(22) Filed: Nov. 7, 2003

(65) Prior Publication Data

US 2005/0101476 A1    May 12, 2005

(51) Int. Cl.
    *B01J 20/26* (2006.01)
(52) U.S. Cl. .................. 502/402; 502/401; 502/406
(58) Field of Classification Search ............ 502/159, 502/402, 527.12, 527.15, 401, 406
    See application file for complete search history.

(56) References Cited

U.S. PATENT DOCUMENTS

| | | | |
|---|---|---|---|
| 4,667,053 A | | 5/1987 | Lin |
| 4,869,826 A | | 9/1989 | Wang et al. |
| 4,920,152 A | | 4/1990 | Reginer et al. |
| 4,980,335 A | * | 12/1990 | Sugo et al. ............... 502/402 |
| 5,085,779 A | | 2/1992 | Crane et al. |
| 5,087,359 A | * | 2/1992 | Kakodkar et al. ........ 210/198.2 |
| 5,137,627 A | * | 8/1992 | Feibush ................... 210/198.2 |
| 5,141,911 A | * | 8/1992 | Meunier et al. ............ 502/159 |
| 5,198,493 A | | 3/1993 | Holmberg et al. |
| 5,403,750 A | | 4/1995 | Braatz et al. |
| 5,496,937 A | * | 3/1996 | Okamoto et al. ........... 536/124 |
| 5,667,976 A | | 9/1997 | Van Ness et al. |
| 5,744,417 A | | 4/1998 | Nagy et al. |
| 6,309,999 B1 | * | 10/2001 | Sharma et al. ............. 502/401 |
| 6,884,345 B1 | * | 4/2005 | Irgum et al. ............. 210/198.2 |
| 2002/0034723 A1 | * | 3/2002 | Leinenbach et al. .......... 435/2 |
| 2004/0000523 A1 | * | 1/2004 | Rosenberg et al. .......... 210/660 |
| 2004/0121437 A1 | * | 6/2004 | Scheels ..................... 435/180 |
| 2005/0161370 A1 | * | 7/2005 | Carnell et al. .......... 208/208 R |

OTHER PUBLICATIONS

Cobianco et al, "A spectroscopic study of Cu(II)-complexes of chelating resins containing nitrogen and sulfur atoms int he chelating groups", Reactive & Functional Polymers, (2000).

* cited by examiner

*Primary Examiner*—David M. Brunsman

(57) ABSTRACT

Medium for chromatographic separations. The medium includes a support with a surface on which interwoven polymers are coated to form a polymer surface. The polymers are covalently linked to the support surface. The polymers are each formed from one or more monomer types and at least one monomer type has an amine functional group. The medium also includes an active molecule immobilized on the polymer surface that is selected to separate reagent materials by chemical structure.

22 Claims, 1 Drawing Sheet

MEDIUM FOR CHROMATOGRAPHIC SEPARATIONS

FIELD OF THE INVENTION

This invention pertains to absorptive coatings for ink-jet printing and ion-exchange, and, more specifically, coatings that are polymerized from and covalently linked to a support.

BACKGROUND OF THE INVENTION

The interaction of ink printed by thermal ink-jet printing and a printed substrate preferably exhibits both short term and long term stability. Ink-jet receiving layers, e.g., plain paper or a coating on coated media, need to absorb the printed ink vehicle to control the spread of color drops and prevent cooling or coalescence of the ink. In addition, the surface of the printed media need to prevent excess horizontal migration of an ink spot over the surface. Long term durability includes smearfastness, smudgefastness, waterfastness, and lightfastness. Smearfastness and a smudgefastness are measures of a printed ink's resistance to physicochemical and physical abrasion, respectively. Waterfastness is a measure of the insolubility of the ink after printing. For example, the printed media should prevent migration of the ink after drying of an image upon exposure to moisture, for example, perspiration, rain or spilled drops of water. Lightfastness is a measure of the capacity of the printed media to retain images thereon in a stable fashion without substantial fading, blurring, distortion, and the like over time in the presence of natural or made-made light.

SUMMARY OF THE INVENTION

In one aspect, the invention comprises a medium for chromatographic separations, comprising a surface comprising a polymer, and an active molecule immobilized on the surface. The polymer is formed from a plurality of monomers comprising one or more monomer types (e.g., ethylene imine or ethylene oxide). At least one of these monomer types has an amine functional group. The active molecule is selected to separate reagent materials by chemical structure. In still another aspect, the invention comprises a catalyst, comprising a surface comprising a polymer, and an active molecule immobilized on the surface. At least one of these monomer types has an amine functional group.

BRIEF DESCRIPTION OF THE DRAWING

The invention is described with reference to the several figures of the drawing, in which.

DEFINITIONS

Figure 1:
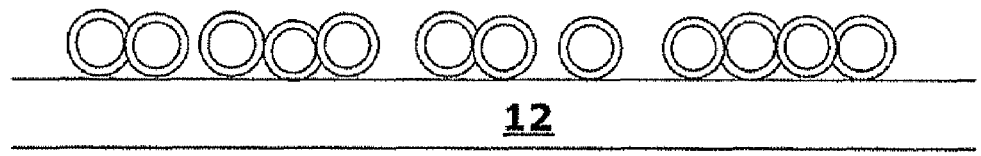
FIG. 1 is a diagram of an ink-jet print medium according to one embodiment of the invention.

"Biomolecules": The term "biomolecules", as used herein, refers to molecules (e.g., proteins, amino acids, peptides, polynucleotides, nucleotides, carbohydrates, sugars, lipids, nucleoproteins, glycoproteins, lipoproteins, steroids, etc.) whether naturally-occurring or artificially created (e.g., by synthetic or recombinant methods) that are commonly found in cells and tissues. Specific classes of biomolecules include, but are not limited to, enzymes, receptors, neurotransmitters, hormones, cytokines, cell response modifiers such as growth factors and chemotactic factors, antibodies, vaccines, haptens, toxins, interferons, ribozymes, anti-sense agents, plasmids, DNA, and RNA.

"Polynucleotide," "nucleic acid," or "oligonucleotide": The terms "polynucleotide," "nucleic acid," or "oligonucleotide" refer to a polymer of nucleotides. The terms "polynucleotide", "nucleic acid", and "oligonucleotide", may be used interchangeably. Typically, a polynucleotide comprises at least three nucleotides. DNAs and RNAs are polynucleotides. The polymer may include natural nucleosides (i.e., adenosine, thymidine, guanosine, cytidine, uridine, deoxyadenosine, deoxythymidine, deoxyguanosine, and deoxycytidine), nucleoside analogs (e.g., 2-aminoadenosine, 2-thiothymidine, inosine, pyrrolo-pyrimidine, 3-methyl adenosine, C5-propynylcytidine, C5-propynyluridine, C5-bromouridine, C5-fluorouridine, C5-iodouridine, C5-methylcytidine, 7-deazaadenosine, 7-deazaguanosine, 8-oxoadenosine, 8-oxoguanosine, O(6)-methylguanine, and 2-thiocytidine), chemically modified bases, biologically modified bases (e.g., methylated bases), intercalated bases, modified sugars (e.g., 2'-fluororibose, ribose, 2'-deoxyribose, arabinose, and hexose), or modified phosphate groups (e.g., phosphorothioates and 5'-N-phosphoramidite linkages).

"Polypeptide", "peptide", or "protein": According to the present invention, a "polypeptide", "peptide", or "protein" comprises a string of at least three amino acids linked together by peptide bonds. The terms "polypeptide", "peptide", and "protein", may be used interchangeably. Peptide may refer to an individual peptide or a collection of peptides. Inventive peptides preferably contain only natural amino acids, although non-natural amino acids (i.e., compounds that do not occur in nature but that can be incorporated into a polypeptide chain; see, for example, http://www.cco.caltech.edu/~dadgrp/Unnatstruct.gif, which displays structures of non-natural amino acids that have been successfully incorporated into functional ion channels) and/or amino acid analogs as are known in the art may alternatively be employed. Also, one or more of the amino acids in an inventive peptide may be modified, for example, by the addition of a chemical entity such as a carbohydrate group, a phosphate group, a farnesyl group, an isofarnesyl group, a fatty acid group, a linker for conjugation, functionalization, or other modification, etc. In a preferred embodiment, the modifications of the peptide lead to a more stable peptide (e.g., greater half-life in vivo). These modifications may include cyclization of the peptide, the incorporation of D-amino acids, etc. None of the modifications should substantially interfere with the desired biological activity of the peptide.

"Polysaccharide", "carbohydrate" or "oligosaccharide": The terms "polysaccharide", "carbohydrate", or "oligosaccharide" refer to a polymer of sugars. The terms "polysaccharide", "carbohydrate", and "oligosaccharide", may be used interchangeably. Typically, a polysaccharide comprises at least three sugars. The polymer may include natural sugars (e.g., glucose, fructose, galactose, mannose, arabinose, ribose, and xylose) and/or modified sugars (e.g., 2'-fluororibose, 2'-deoxyribose, and hexose).

"Absorptivity": The term "absorptivity", as used herein, refers to the ability of an ink-jet print medium to absorb or bind dye or pigment from an ink (which usually comprises dye and/or pigment in a carrier fluid). The term "absorptivity" may also be used to describe the ability of a column to absorb or bind one or more components of a reagent fluid. "Binding" includes covalent bonding, electrostatic interaction, van der Waals attractions, dipole-dipole attractions, pi-bonding, physical entanglement, and all other forms of chemical or physical attachment.

DETAILED DESCRIPTION

Figure 2:
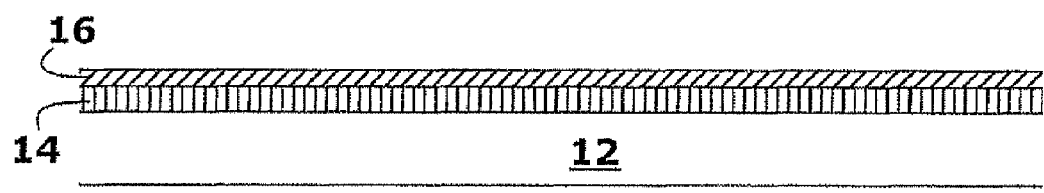
FIG. 2 is a diagram of an ink-jet print medium according to another embodiment of the invention.

The invention provides methods of modifying a surface to produce a high isoelectric point support with a high ion-exchange capability and particle dispersion stability. In general, a polyethylene-based coating such as poly(ethylene imine) (PEI) is polymerized from the surface of a support such as silica or alumina. The polymer is linked to the support through covalent bonds between a functional group of the polymer and the negatively charged (e.g., $-SiO^-$ or $-Al_2O_2^-$) surface of the support. This linkage reduces or prevents the desorption and surface rearrangement problems that can occur when adsorbed polyimine species are exposed to extreme pH levels. Polymerization from the surface of the support allows control of the physical and chemical properties of the composite through independent variation of the support particle size, polymer layer thickness, and polymer composition (through copolymerization). The support may be monolithic, for example, a particle, or a coating on a substrate, for example, a coated paper. In one embodiment, the support is deposited on the paper or other substrate as a sol. FIG. 1 shows coated particulate supports deposited onto a paper substrate 12 according to the invention, while FIG. 2 shows a paper substrate 12 coated with a layer of silica 14 and a polymer coating 16.

The polymeric material may be polymerized from the support before or after attachment to the substrate. Polymerization before attachment facilitates the use of wet chemistry during polymerization, which is typically more versatile, while polymerization after attachment may be more conveniently achieved, for example, by use of solid monomers dry-cured with heat, radiation, or the application of a catalyst. Polymerization after attachment also avoids difficulties with the attachment of the support to the substrate due to materials incompatibilities (e.g., viscosity changes), and may facilitate a greater degree of interpenetration between the polymer and the support. In addition, concentration changes in the monomer layer may be used to form a polymer having gradient properties, such as a higher molecular weight near the surface and a lower molecular weight in the near the support.

In a preferred embodiment, the polymer is prepared by ring-opening polymerization, although a free radical polymerization may also be used to prepare the polymers of the invention. Both ends of the polymer and the secondary amines along the chain can react with the ethylene imine monomer. As a result, the final polymer products will be a highly interwoven polymer such as a dendritic, branched, or hyper-branched polymer. The coating provides a porous, three-dimensional interwoven surface reminiscent of a sponge.

In one embodiment, the surface of the support is modified by nucleophilic addition. For example, amines, thiols, metals, metal oxides, and alkoxides may be covalently attached to the surface of the support before polymerization. These polymerization initiators may be attached to the support surface prior to polymerization, for example via organosilanes or amino acids bonded to the support surface. In general, it is preferred that such a separate initiator be used if polymerization directly from the support would require conditions tending to degrade or dissolve the substrate. For example, in ethyleneimine reactions, a surface alkoxide initiator is not preferred with an alumina substrate because the strongly basic condition tends to dissolve the substrate, causing polymerization to occur from free-floating dissolved alkoxides, rather than solely from the subtrate surface. For silicon-based substrates, chemical attachment is preferably made by using a halo-silica or hydroxy silica compound that condenses with the silicon surface groups. Functional groups attached to the organosilicon are then used as polymerization initiators.

The thickness of polymer deposited on the support surface may be controlled, for example by the use of a starved-feed polymerization. Those of ordinary skill in the art will understand how to calculate the approximate number of surface sites on the support in order to determine molecular weight and thickness. For example, silane has a footprint of approximately 50 square angstroms, while a simple poly (ethylene imine) chain has a footprint of approximately 100 square angstroms. Thus, it is expected that about half of the initiator sites will be occupied. This information, along with the size of the monomer species, can be used to determine how much monomer should be added in order to obtain a given coating thickness.

Polymerization may be carried out in either a batch or continuous process, or in a semicontinuous process in which a quantity of reaction mixture is transported from tank to tank. In one embodiment of the invention, polymerization is carried out in a continuous or semicontinuous process by passing supports (optionally modified as discussed above) through one or more tanks or pipelines receiving the ethylene imine monomer feed. This monomer boils at a temperature of about 5° C., so the reaction is preferably carried out at a lower temperature, and/or under sufficient pressure to condense the monomer. The relatively low boiling point of the monomer may be advantageous for processing, since no centrifugation is required to remove excess monomer after polymerization—the supports can simply be exposed to ambient temperature and pressure in order to vaporize and recover any unreacted monomer.

In a continuous or semicontinuous starved-feed process, residence time is typically not exactly equal to reaction time, because the monomer is not always available to each particle in the tank. The more evenly distributed the monomer is through the reaction mixture, the more evenly distributed the molecular weight of the coatings will be. Thus, those skilled in the art will recognize that the fluid dynamics of the monomer-support mixture should be well understood and controlled in order to achieve the most reproducible results. However, when polymer thickness and molecular weight are not of major concern, even relatively crude control of the support-monomer interaction can produce adequately coated supports for use in the invention.

A wide variety of materials may be attached to the polymer surface after polymerization. One skilled in the art will be familiar with the many functional groups that may be attached to a surface by nucleophilic addition. Exemplary reactions are described in Odian, *Principles of Polymerization*, Wiley-Interscience, 1991, which is incorporated herein by reference. Alternative support surface groups, such as boehmite, zirconate or titanate, may also be used to exploit the techniques of the invention. One skilled in the art will recognize that the PEI can be covalently attached via polymerization to almost any nucleophilic surface.

One skilled in the art will recognize that the properties of the polymer-coated surface depend partially on the properties of the support. For example, an alumina or boehmite surface exhibits certain ion exchange and dye fixation properties. The techniques of the invention allow one skilled in the art to tailor the surface charge and dye fixation properties of the surface. The PEI coatings of the invention convert the silica surface from a low isoelectric point, acidic surface to a higher iso-electric point, basic surface allowing adsorption of acidic species. The properties of an unmodified PEI surface may depend on the pH of an ink or other solution to which they are subsequently exposed. Even more basic surface properties may be achieved by surface modification of the PEI coating. For example, the PEI coatings of the invention allow strongly basic groups such as quaternary ammonium alkyl compounds to be tethered an alumina surface by addition of methyl compounds such as methyl bromide, methyl iodide, or similar compounds that react with the amino group of the PEI by ion exchange to yield quaternary ammonium groups. Those of ordinary skill in the art will recognize that the counterion selected will have a significant effect on ink absorption. Iodine is better for fast, quantitative exchange than bromine anion for exchange with a smaller chlorine anion, and better to exchange with multivalent ions such as phosphate, organophosphate, or sulfate. This ion exchange chemistry is described in common ion exchange literature, for example Nachod, "Ion exchange Technology" (Academic press, NY, 1956), and Kunin, "Elements of ion exchange" (Reinhold, N.Y., 1960), which are incorporated by reference herein. In some cases, it may be advantageous to reduce the intensity of ion exchange/adsorption in ink-jet print media to reduce coalescence of the dyes prior to dye penetration of the surface. Reducing the rate of adsorption using alternative anions, such as bromide, sulfate, or chloride, may reduce adsorption efficiency but allow relatively irreversible adsorption (fixing) of dyes for image water and humidity bleed resistance. Addition of these and other functional groups to the surface can be achieved as part of a continuous reaction process.

Poly(ethylene imine) is a common fixing agent for dyes. Still, one skilled in the art will recognize that it may be desirable to tether other agents to the coating to enhance its dye fixing abilities. For example, a cross-linking agent, such as a diisocyanate, diepoxide, glyoxal, glutaraldehyde, dicarboxy acid (in the presence of carbodiimide), di(N-acylimidazoles), or di(vinylsulfone), may be added to the PEI coating to improve its physical durability under both wet and dry conditions and to improve water resistance. Fade protecting molecules such as UV Absorbers, HALS, or antioxidants may be added to the coating to improve lightfastness. These groups may be covalently attached to the polymer or may be retained on the polymer through electrostatic interactions with the amine groups on the polymer. Interparticle spacing of the supports through use of the polymer layer thickness may be utilized to filter unwanted light, to reduce yellow hues from the paper or ultraviolet from ambient sources.

The techniques of the invention promote smudgefastness of a printed ink by promoting good wetting and electrostatic interactions between the dye and the coating substrate. The coating may also enhance lightfastness of dyes printed on alumina surfaces by fixing the dye molecules, providing fixed dye structures as nucleation sites for further aggregation.

Figure 3:
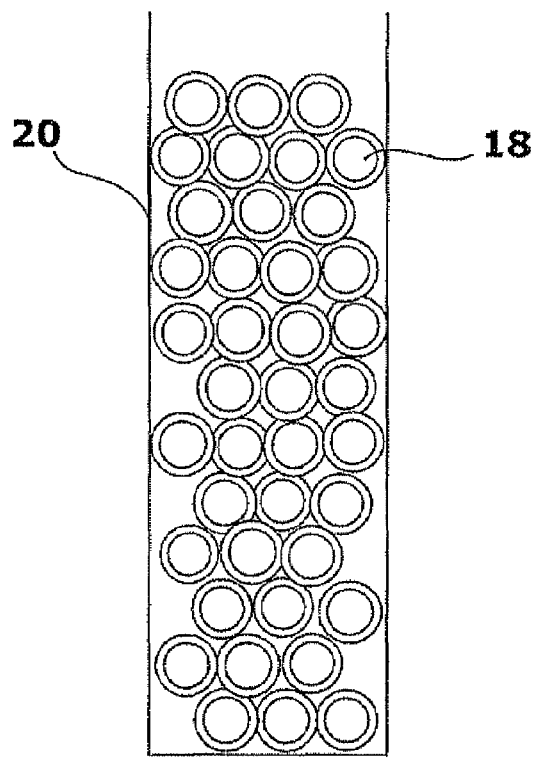
FIG. 3 is a diagram of a packed column that may be used for chromatographic separations according to still another embodiment of the invention.

In an alternative embodiment, the techniques of the invention may be used to modify the chromatographic properties of ion-exchange resins. While materials such as silica and alumina already possess ion-exchange properties and are commonly used to perform chrornatographic separations, the techniques of the invention may be used to enhance the selectivity of these materials through variation of porosity, pore dimension, hydrophobicity, pH, or surface chirality. For example, biomolecules such as antibodies, polynucleotides and enzymes may be tethered onto PEI-coated silica particles 18 and packed into a column 20, as shown in FIG. 3. Reaction catalysts may be attached for fixed bed or dispersible reaction catalysis, such as surface metal oxides. Alternatively, particles may be fabricated from a molecularly nucleated PEI without the need for a solid support.

The column, instead of merely separating materials based on non-specific interactions such as hydrogen bonding, will separate materials based on their chemical structure. A column loaded with antibody-coated particles will separate a specific antigen from a solution. Likewise, polynucleotide coated particles will organize the DNA or RNA in a solution in order of its degree of hybridization with the immobilized polynucleotide. The DNA or RNA sequence having the worst match with the immobilized polynucleotide will emerge from the column first, while nucleotide sequences that are the best match to the immobilized polynucleotide will emerge last. Indeed, highly polar solvents may be required to separate these DNA or RNA sequences from the polynucleotide immobilized on the column. If enzymes are immobilized on the column, materials passing through the column will undergo the reactions catalyzed by those enzymes, and the reaction products may be collected at the end of the column.

Alternatively, a silica particle may be modified to separate materials flowing through the column by mass or density. For example, hydrocarbon chains may be attached directly to the particle, a PEI coated particle, or a PEI particle through nucleophilic addition. As materials proceed through the column, they must negotiate past the hydrocarbon chains to adsorb onto the silica particle. For example, in a mixture of proteins and small molecules, the proteins will be unable to interact with the silica particles due to the hydrocarbon buffer, while the small molecules will easily penetrate the buffer layer and adsorb onto the silica particles.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A medium for chromatographic separations, comprising:
   a support with a surface on which interwoven polymers are coated to form a polymer surface, wherein the polymers are covalently linked to the support surface and wherein the polymers are each formed from a plurality of monomers comprising one or more monomer types, at least one of the one or more monomer types having an amine functional group, wherein the one or more monomer types comprise ethylene oxide and ethylene imine; and
   an active molecule immobilized on the polymer surface, wherein the active molecule is selected to separate reagent materials by chemical structure.

2. The medium of claim 1, wherein the support is an oxide support.

3. The medium of claim 2, wherein the support is a silica support.

4. The medium of claim 3, wherein the interwoven polymers comprise poly(ethylene imine) polymers.

5. The medium of claim 2, wherein the support is an alumina support.

6. The medium of claim 5, wherein the interwoven polymers comprise poly(ethylene imine) polymers.

7. The medium of claim 2, wherein the interwoven polymers comprise poly(ethylene imine) polymers.

8. The medium of claim 1, wherein the active molecule is selected from the group consisting of antibodies, polynucleotides, and optionally substituted hydrocarbon chains.

9. The medium of claim 8, wherein the active molecule is an antibody.

10. The medium of claim 9, wherein the interwoven polymers comprise poly(ethylene imine) polymers.

11. The medium of claim 8, wherein the active molecule is a polynucleotide.

12. The medium of claim 11, wherein the interwoven polymers comprise poly(ethylene imine) polymers.

13. The medium of claim 8, wherein the active molecule is an optionally substituted hydrocarbon chain.

14. The medium of claim 13, wherein the interwoven polymers comprise poly(ethylene imine) polymers.

15. The medium of claim 8, wherein the interwoven polymers comprise poly(ethylene imine) polymers.

16. The medium of claim 1, wherein the polymer surface has a porosity, pore dimension, hydrophobicity, pH, or surface chirality selected to promote separation of the reagent materials.

17. The medium of claim 16, wherein the interwoven polymers comprise poly(ethylene imine) polymers.

18. The medium of claim 1, wherein the active molecule is covalently linked to the polymer surface.

19. The medium of claim 18, wherein the interwoven polymers comprise poly(ethylene imine) polymers.

20. The medium of claim 1, wherein the support is a particle.

21. The medium of claim 20, wherein the interwoven polymers comprise poly(ethylene imine) polymers.

22. The medium of claim 1, wherein the interwoven polymers comprise poly(ethylene imine) polymers.

* * * * *